(12) United States Patent
Maeda et al.

(10) Patent No.: US 7,898,127 B2
(45) Date of Patent: Mar. 1, 2011

(54) STATOR OF ROTATING ELECTRIC MACHINE

(75) Inventors: Susumu Maeda, Tokyo (JP); Kazuki Nakanishi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 149 days.

(21) Appl. No.: 12/343,038

(22) Filed: Dec. 23, 2008

(65) Prior Publication Data
US 2009/0184590 A1 Jul. 23, 2009

(30) Foreign Application Priority Data

Jan. 17, 2008 (JP) ............................. 2008-007602

(51) Int. Cl.
H02K 9/04 (2006.01)
(52) U.S. Cl. ............................. 310/58; 310/52; 310/54
(58) Field of Classification Search .................. 310/52, 310/54, 58, 59, 201, 208, 260, 270
See application file for complete search history.

(56) References Cited

U.S. PATENT DOCUMENTS

| 3,192,423 A | * | 6/1965 | Pearson ........................ 310/201 |
| 4,117,358 A | * | 9/1978 | Flick ............................ 310/59 |
| 4,629,917 A | * | 12/1986 | Brem ........................... 310/59 |
| 5,270,598 A | | 12/1993 | Holly, III et al. |
| 5,323,079 A | | 6/1994 | Nieves et al. |
| 6,577,038 B2 | * | 6/2003 | Butman et al. .............. 310/201 |
| 7,088,020 B2 | | 8/2006 | Holly, III et al. |

FOREIGN PATENT DOCUMENTS

| JP | 6-014483 A | 1/1994 |
| JP | 3431948 B2 | 5/2003 |

* cited by examiner

*Primary Examiner*—Tran N Nguyen
(74) *Attorney, Agent, or Firm*—Buchanan Ingersoll & Rooney PC (57) ABSTRACT

A stator of a rotating electric machine is obtained, in which material usage in a conductor connection section of a stator coil end and weight of the conductor connection section are reduced, so that vibration suppression is improved, in addition, thermal resistance between a loss occurrence portion and a cooled portion becomes smaller so that temperature rise is suppressed. It is configured that a stator has first and second wire groups disposed at an inner diameter side of a slot, third and fourth wire groups disposed at an outer diameter side of the slot, and a connection conductor for connecting the respective, two wire groups to each other in a radial direction, wherein the stator further has a connection conductor which has one end being interposed between projected ends of the first and second wire groups, and connected to the respective projected ends, and has the other end being interposed between projected ends of the third and fourth wire groups, and connected to the respective projected ends, in addition, has axial through-holes, which communicate with flow paths of coolant flow members provided between the wire groups, in the one end and the other end respectively.

8 Claims, 9 Drawing Sheets

STATOR OF ROTATING ELECTRIC MACHINE

BACKGROUND OF THE INVENTION

1. Field of the Invention

The present invention relates to a stator of a rotating electric machine that can be preferably used for a polyphase generator and the like, and more specifically relates to improving a connection device of a stator coil end.

2. Description of the Related Art

As a stator of a conventional rotating electric machine, a stator is given, in which a stator coil to be inserted into a slot of a stator iron core is configured by four wire groups, and when the four wire groups are collectively connected at a coil end, which is projected from a slot end in an axial direction of a rotor, a large circulating current flows between the wire groups, therefore the wire groups are divided into two wire groups each, and a conductive block is used to connect between the two wire groups at a stator coil end respectively, and the respective, two wire groups are separately connected to another stator coil in the slot in a radial direction by a connection conductor. The connection conductor is provided on outer side faces of the wire groups (for example, refer to U.S. Pat. No. 7,088,020 (p1, FIGS. 1 and 6) and JP-A-6-14483 (p1, FIG. 3)).

In the previous stator of a rotating electric machine configured as above, the conductive block was necessary to be provided for electrically connecting between the divided, two wire groups adjacent to each other at the stator coil end. In addition, since the connection conductor was provided on outer side faces of wire groups, the connection conductor connecting the stator coil end, which was collectively connected by the conductive block, to another stator coil in a slot for the respective, two wire groups, the connection conductor and the conductive block were doubly present in a circumferential direction in the relevant connection portion, leading to a problem that material usage was increased. Moreover, the conductive block and the connection conductor were present in the stator coil end in this way, leading to a problem that weight was increased, which was disadvantageous in vibration suppression. Moreover, since a current largely flows through a region approximately 10 mm (penetration depth) inside the connection conductor due to reduced electric resistance and the skin effect, significant loss occurs at a stator iron core side of the connection conductor. In the previous structure as above, since a heat path for cooling the connection portion is long, including a path from the connection conductor to the conductive block via a bonding surface between the connection conductor and wire groups, the wire groups, and a bonding surface between the conductive block and the wire groups, thermal resistance is increased, which causes high temperature, leading to a possibility that an insulative material applied to a tip of the stator coil end was degraded. This led to a problem that a current was restricted in current carrying.

SUMMARY OF THE INVENTION

The invention has been made to solve the problems in the related art as above, and an object of the invention is to obtain a stator of a rotating electric machine in which the material usage is reduced in a connection section in a radial direction in a coil end portion projected from a slot of a stator coil, therefore weight is reduced, so that vibration is suppressed, in addition, thermal resistance between a loss occurrence portion and a cooled portion becomes smaller so that temperature rise is suppressed.

A stator of a rotating electric machine according to an aspect of the invention has a stator iron core having a plurality of slots, a plurality of first and second wire groups at an inner diameter side and third and fourth wire groups at an outer diameter side, each of the plurality of sets of first, second, third and fourth wire groups is inserted into the one of the plurality of slots in two rows and two stages, projecting from both of the slot ends in an axial direction, a plurality of first coolant flow members, each of the plurality of first coolant flow members has a coolant flow path in an axial direction, disposed between the first wire group and the second wire group, projecting, shorter than the first and second wire groups, from both of the slot ends in an axial direction, a plurality of second coolant flow members, each of the plurality of second coolant flow members has a coolant flow path in an axial direction, disposed between the third wire group and the fourth wire group, projecting, shorter than the third and fourth wire groups, from both of the slot ends in an axial direction, and a plurality of connection conductors, each of the plurality of connection conductors is interposed between one of the projected ends of the first and second wire groups, and has axial through-holes, which communicate with the flow path of the first coolant flow member, in such an interposed region, and is interposed between one of the projected ends of the third and fourth wire groups, and has axial through-holes, which communicate with the flow path of the second coolant flow member, in such an interposed region, and connects between one of the projected ends of the first and second wire groups and one of the projected ends of the third and fourth wire groups.

The foregoing and other objects, features, aspects and advantages of the present invention will become more apparent from the following detailed description when read in conjunction with the accompanying drawings.

DETAILED DESCRIPTION OF THE PREFERRED EMBODIMENT OF THE INVENTION

Embodiment 1

Figure 1:
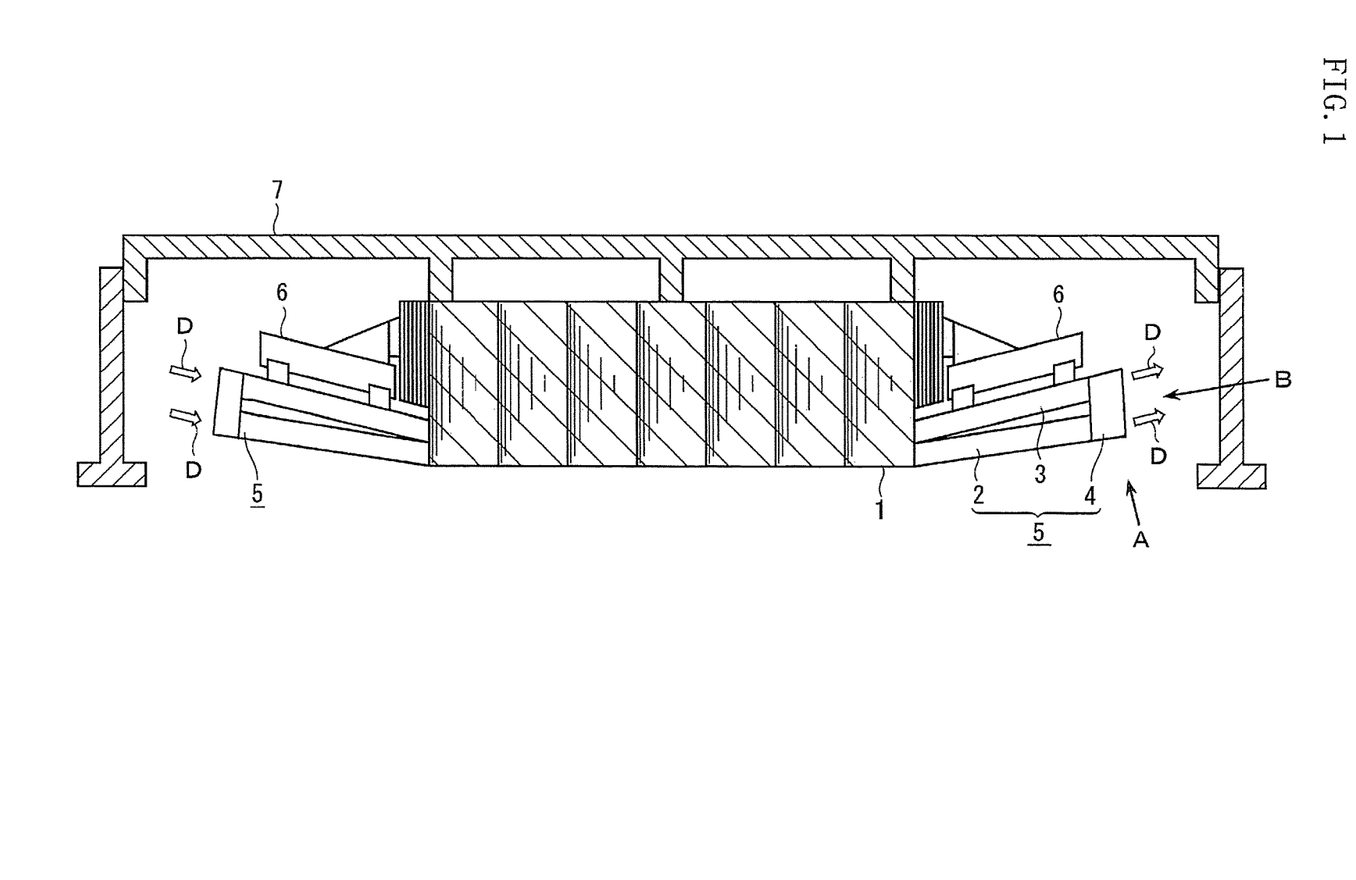
FIG. 1 shows a relevant-part section diagram schematically showing approximately the upper half of a stator of a rotating electric machine according to embodiment 1 of the invention.
Figure 2:
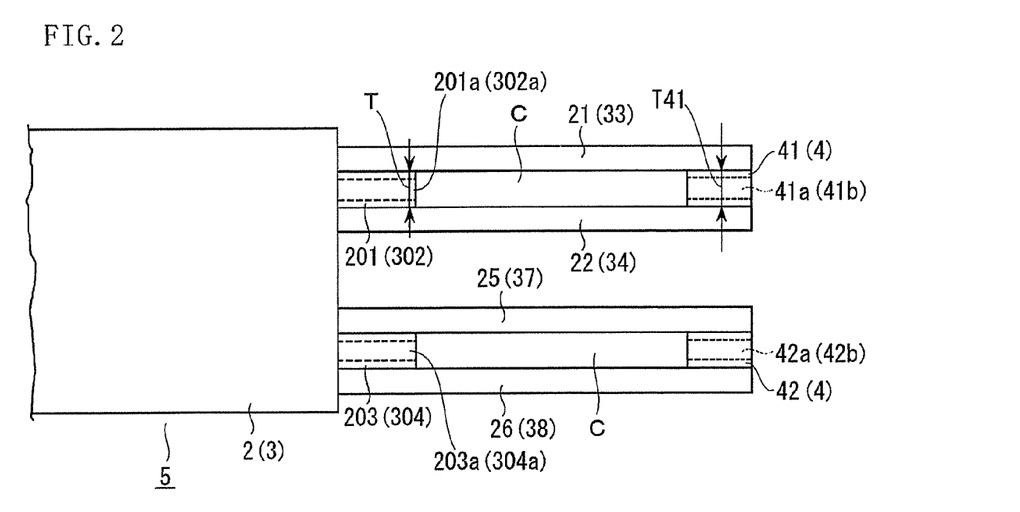
FIG. 2 shows a diagram of a coil end in the right of FIG. 1, which is seen in a direction of an arrow A in FIG. 1.
Figure 3:
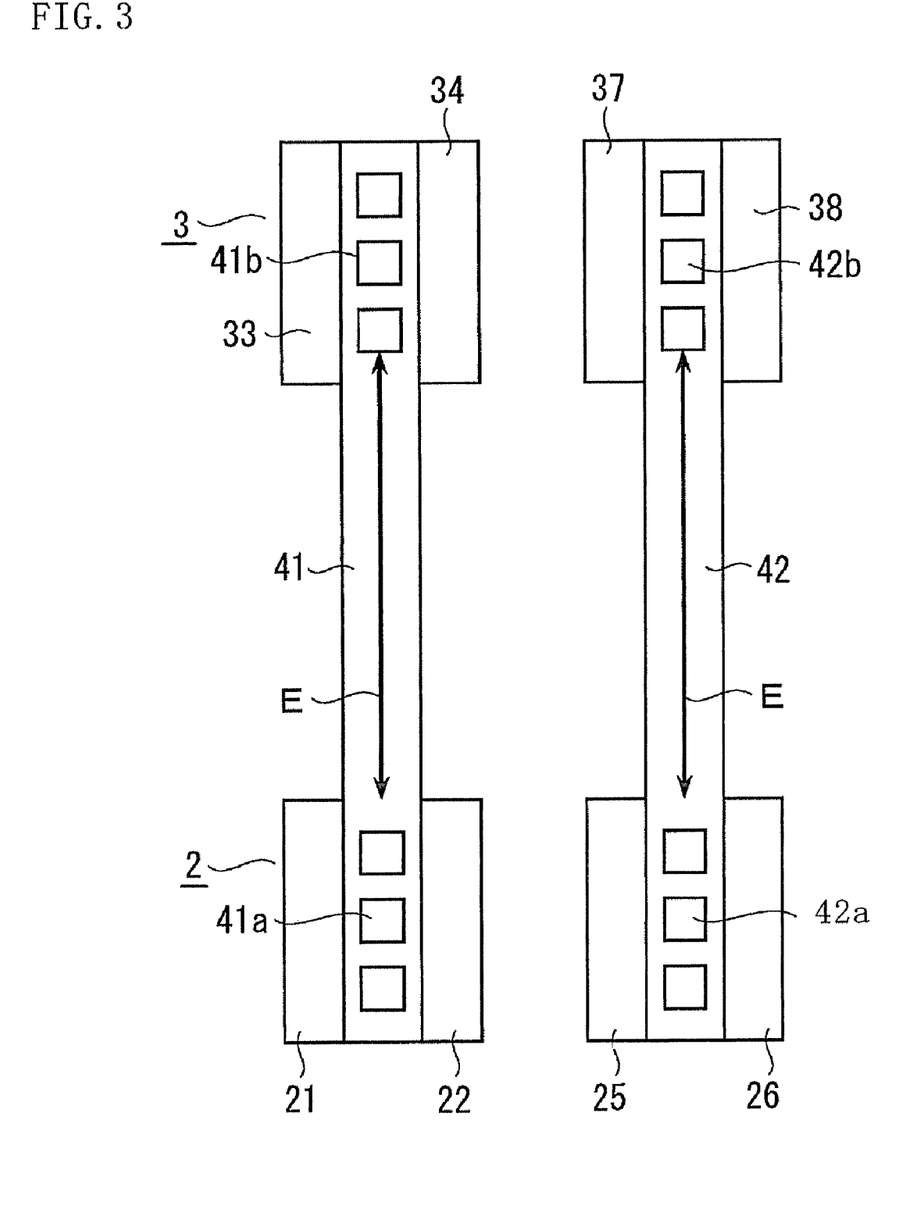
FIG. 3 shows a diagram of the coil end in the right of FIG. 1, which is seen in a direction of an arrow B in FIG. 1.
Figure 4:
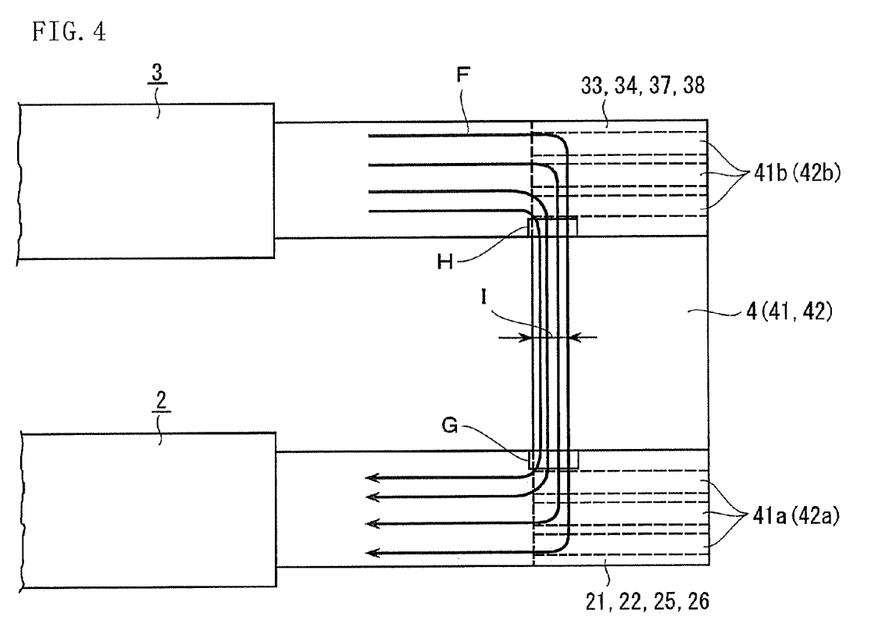
FIG. 4 shows a diagram for illustrating a current path flowing through the coil end in the right of FIG. 1.

FIGS. 1 to 4 illustrate a stator of a rotating electric machine according to embodiment 1 of the invention. FIG. 1 shows a relevant-part section diagram schematically showing an approximately upper half of the stator, FIG. 2 shows a coil end in the right of FIG. 1, which is seen in a direction of an arrow A of FIG. 1, FIG. 3 shows the coil end seen in a direction of an arrow B, and FIG. 4 shows a diagram illustrating a current path flowing into the coil end. The same signs show the same or corresponding parts through the figures. In FIG. 1, the stator of the rotating electric machine is formed in a cylindrical shape enclosing a rotor (omitted to be shown), and includes a stator iron core 1 having slots (omitted to be shown) to be inserted with a coil at a center side (lower side in the figure), an inner diameter side coil 2 that is disposed at an inner diameter side (lower side in the figure) of the slot, and projected from an end of the slot in an axial direction of the rotor, an outer diameter side coil 3 that is disposed at an outer diameter side (upper side in the figure) of the slot, and projected from the end of the slot in the axial direction of the rotor, and a connection conductor 4 for connecting a projected end of the inner diameter side coil 2 to a projected end of the outer diameter side coil 3 in a radial direction, a stator coil supporter 6 for fixing projected portions of the coil 5, and a casing 7 or the like.

The inner diameter side coil 2 has a first wire group 21; a second wire group 22 arranged with a predetermined space in a circumferential direction with respect to the first wire group 21; a first coolant flow member 201 inserted between the first and second wire groups 21 and 22 (inserted into the predetermined space), in which projected length from the slot end is short compared with each of the first and second wire groups 21 and 22, and a coolant flow path 201*a* is formed in an axial direction within the flow member; a fifth wire group 25 arranged parallel to the first and second wire groups 21 and 22 via a spacer omitted to be shown; a sixth wire group 26 arranged with a predetermined space in a circumferential direction with respect to the fifth wire group 25; and a third coolant flow member 203 inserted between the fifth and sixth wire groups 25 and 26, in which projected length from the slot end is short compared with each of the fifth and sixth wire groups 25 and 26, and a coolant flow path 203*a* is formed in an axial direction within the flow member; and an insulating coating as in the past, which is not particularly shown.

As in the inner diameter side coil 2, the outer diameter side coil 3 has a third wire group 33; a fourth wire group 34 arranged with a predetermined space in a circumferential direction with respect to the third wire group 33; a second coolant flow member 302 inserted between the third and fourth wire groups 33 and 34, in which projected length from the slot end is short compared with each of the third and fourth wire groups 33 and 34, and a coolant flow path 302*a* is formed in an axial direction within the flow member; a seventh wire group 37 arranged parallel to the third and fourth wire groups 33 and 34 via a spacer omitted to be shown; an eighth wire group 38 arranged with a predetermined space in a circumferential direction with respect to the seventh wire group 37; and a fourth coolant flow member 304 inserted between the seventh and eighth wire groups 37 and 38, in which projected length from the slot end is short compared with each of the seventh and eighth wire groups 37 and 38, and a coolant flow path 304*a* is formed in an axial direction within the flow member; and an insulating coating as in the past, which is not particularly shown. It is preferable that the first, second, third and fourth wire groups 21, 22, 33 and 34 are inserted into one slot in two rows and two stages.

Ends of the inner diameter side coil 2 and ends of the outer diameter side coil 3 are connected to be approximately parallel in a radial direction by a first connection conductor 41 and a second connection conductor 42 respectively (hereinafter, they are called a connection conductor 4 except for a case that they need to be distinguished from each other). More specifically, in the first connection conductor 41, one end (lower portion of FIG. 3) is interposed between projected ends of the first and second wire groups 21 and 22, and connected to the respective first and second wire groups 21 and 22; the other end (upper portion of FIG. 3) is interposed between projected ends of the third and fourth wire groups 33 and 34, and connected to the respective third and fourth wire groups 33 and 34; axial through-holes 41*a*, which communicate with the flow path 201*a* of the first coolant flow member 201, are provided in a region interposed between the first and second wire groups 21 and 22 of the one end; and axial through-holes 41*b*, which communicate with the flow path 302*a* of the second coolant flow member 302, are provided in a region interposed between the third and fourth wire groups 33 and 34 of the other end. Similarly, in the second connection conductor 42, one end is interposed between projected ends of the fifth and sixth wire groups 25 and 26, and connected to the respective fifth and sixth wire groups 25 and 26; the other end is interposed between projected ends of the seventh and eighth wire groups 37 and 38, and connected to the respective seventh and eighth wire groups 37 and 38; axial through-holes 42*a*, which communicate with the flow path 203*a* of the third coolant flow member 203, are provided in a region interposed between the fifth and sixth wire groups 25 and 26 of the one end; and axial through-holes 42*b*, which communicate with the flow path 304*a* of the fourth coolant flow member 304, are provided in a region interposed between the seventh and eighth wire groups 37 and 38 of the other end.

In the embodiment 1, thickness T41 of the connection conductor 4 (41 or 42) is made to be equal to width T of each of the coolant flow members (201, 203, 302 and 304) in order to make a configuration where connection of the connection conductor is made on an extension line of a wire group without performing extra processing to the wire or the wire group to save time in construction. In addition to the above, the respective projected portions of the inner diameter side coil 2 and the outer diameter side coil 3, and the connection conductor 4 are subjected to insulating coating by an insulative member omitted to be shown except for spaces C between the respective wire groups, which are flow path of cooling air, and the through-holes 41*a*, 41*b*, 42*a* and 42*b* provided in the connection conductor 4, and fixed to the stator iron core 1 by the stator coil supporter 6, as in the past. While description was made on a connection structure in a radial direction of the coil 5 in a right end of FIG. 1, a connection structure in a radial direction of the coil is the same even in a left end of the figure, which is configured such that a coolant such as air or hydrogen gas is circulated by a forced draft unit omitted to be shown through the flow paths 201*a*, 203*a*, 302*a* and 304*a* provided within the coil 5 and the through-holes 41*a*, 41*b*, 42*a* and 42*b* provided in the connection conductor 4, as shown by arrows D in FIG. 1.

In the embodiment 1 configured as above, the one end of the first connection conductor 41 provided between the ends of the first and second wire groups 21 and 22 configuring the inner diameter side coil 2, and the other end of the first connection conductor 41 provided between the ends of the third and fourth wire groups 33 and 34 configuring the outer diameter side coil 3 have a function of the previous conductive block respectively, which electrically connect between the ends of the first and second wire groups 21 and 22, and electrically connect between the ends of the third and fourth wire groups 33 and 34 respectively, and connect the end of the inner diameter side coil 2 to the end of the outer diameter side coil 3 in series in a radial direction. This eliminates need of the previous conductive block for connecting circumferentially adjacent wire groups to each other. Therefore, material usage is reduced, in addition, weight of the end of the coil 5 (coil end portion) is reduced, which is advantageous in vibration suppression. Moreover, since the axial through-holes 41a, 41b, 42a and 42b for ventilation, which communicate with the flow paths 201a, 203a, 302a and 304a of the coolant flow members 201, 203, 302 and 304 provided in the slot portions respectively, are provided in the one ends and the other ends of the connection conductor 4 respectively, cooling capability is also secured.

Moreover, the conductive block as in the past is not used, thereby the number of connection portions is decreased, which reduces length of a current path, and therefore heat generation is decreased, in addition, thermal resistance of the connection portions can be decreased. The connection conductor is directly cooled by the ventilation holes, which can eliminate influence of thermal resistance at bonding surfaces between the connection conductor and the wire groups, at which thermal resistance is maximized in a cooling path in the past, therefore thermal resistance of a heat path E (FIG. 3) is significantly decreased when heat generated in the connection conductor 4 is radiated from the through-holes 41a, 41b, 42a and 42b, and consequently temperature rise can be suppressed, so that an allowable current of a generator can be increased. Moreover, as shown by an arrow F in FIG. 4, a current concentrates in a stator iron core side of the connection conductor 4 (left of FIG. 4), a G region of an outer diameter side surface of the first and second wire groups 21 and 22, and an H region of an inner diameter side surface of the third and fourth wire groups 33 and 34, and flows through a region shown by I of the connection conductor 4 (about 10 mm). Thus, the through-holes 41a, 41b, 42a and 42b are provided with a distance of at least 10 mm from the current concentration regions respectively, thereby the problem of heat generation can be avoided.

As described above, in a word, the embodiment 1 is configured such that the stator has the stator iron core 1 having a plurality of slots, a plurality of first and second wire groups 21 and 22 at the inner diameter side and the third and fourth wire groups 33 and 34 at the outer diameter side, each of the plurality of sets of first, second, third and fourth wire groups is inserted into the one of the plurality of slots in two rows and two stages, projecting from both of the slot ends in an axial direction, a plurality of first coolant flow members 201, each of the plurality of first coolant flow members 201 has a coolant flow path 201a in an axial direction, disposed between the first wire group 21 and the second wire group 22, projecting, shorter than the first and second wire groups 21 and 22, from both of the slot ends in an axial direction, a plurality of second coolant flow members 302, each of the plurality of second coolant flow members 302 has a coolant flow path 302a in an axial direction, disposed between the third wire group 33 and the fourth wire group 34, projecting, shorter than the third and fourth wire groups 33 and 34, from both of the slot ends in an axial direction, and first connection conductor 41 being a plurality of connection conductors 4, each of the plurality of connection conductors 4 is interposed between one of the projected ends of the first and second wire groups 21 and 22, and has axial through-holes 41a, which communicate with the flow path 201a of the first coolant flow member 201, in such an interposed region, and is interposed between one of the projected ends of the third and fourth wire groups 33 and 34, and has axial through-holes 41b, which communicate with the flow path 302a of the second coolant flow member 302, in such an interposed region, and connects between one of the projected ends of the first and second wire groups 21 and 22 and one of the projected ends of the third and fourth wire groups 33 and 34. According to the embodiment 1 configured in this way, the end of the inner diameter side coil 2 and the end of the outer diameter side coil 3, each being projected in the axial direction from the slot end, are connected to each other in the radial direction by the connection conductor 4 (41) having the axial through-holes 41a and 41b in the regions interposed between the projected ends as described above, the conductive block is not necessary. Therefore, material usage is reduced, leading to reduction in weight of the end of the coil 5, which is advantageous in vibration suppression. In addition, since the axial through-holes 41a, 41b, 42a and 42b for direct ventilation are provided in the connection conductor 4, thermal resistance between a loss occurrence portion in a central area of the connection conductor 4 and the through-holes 41a, 41b, 42a and 42b for ventilation is reduced, therefore temperature rise is suppressed, leading to an advantage that an allowable value of a current in current carrying can be increased. Moreover, heat generation is suppressed, which suppresses deterioration of the insulative material omitted to be shown, and furthermore, the material usage is reduced, thereby cost can be reduced.

Embodiment 2

Figure 5:
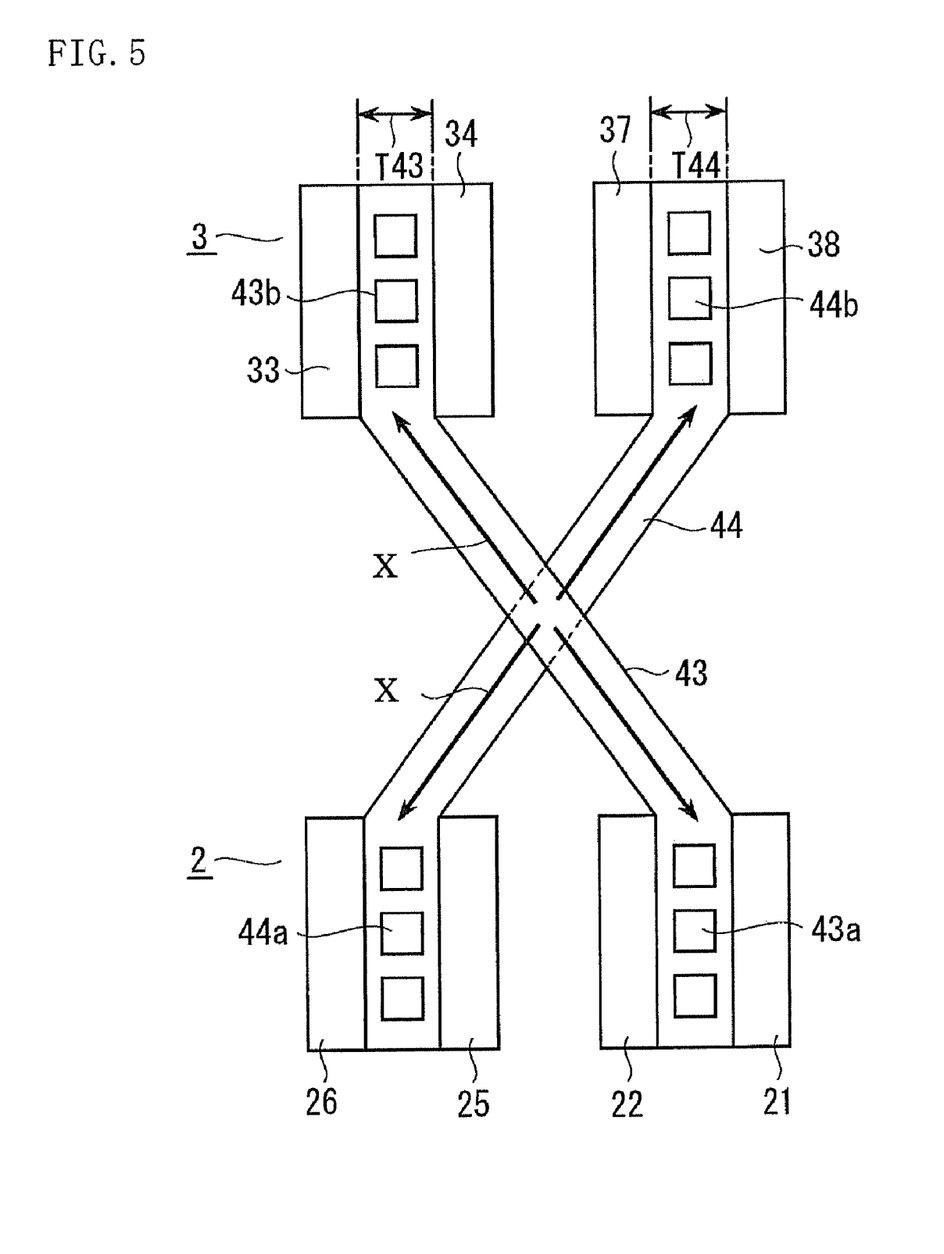
FIG. 5 shows a side diagram schematically showing a connection section of a stator coil end, the connection section being a relevant part of a stator of a rotating electric machine according to embodiment 2 of the invention.

FIG. 5 shows a side diagram schematically showing a connection section of a stator coil end being a relevant part of a stator of a rotating electric machine according to embodiment 2 of the invention, which corresponds to a diagram seen in the same direction as FIG. 3 of the embodiment 1. The embodiment 2 shows an example that a connection conductor 4 is configured in a crossover pattern, the connection conductor connecting, in a radial direction, between the ends of the inner diameter side coil 2 disposed in the inner diameter side of the slot shown in FIG. 1 and the ends of the outer diameter side coil 3 disposed in the outer diameter side of the slot. In the figure, the inner diameter side coil 2 is arranged in order of a first wire group 21, second wire group 22, fifth wire group 25, and sixth wire group 26 from the right to the left of the figure, that is, arranged in a reverse order to that in the embodiment 1, and the outer diameter side coil 3 is disposed in the same way as in the embodiment 1. Both ends of the inner diameter side coil 2 and the outer diameter side coil 3 are connected by a first connection conductor 43 and a second connection conductor 44 such that the connection conductors are seen to cross each other when both ends of the inner diameter side coil 2 and the outer diameter side coil 3 are seen in an axial direction. Such connection is called crossover connection. In a crossing area, the first connection conductor 43 and the second connection conductor 44 are arranged in a manner of being displaced from each other in an axial direction of a rotor (front to back direction of paper plane of FIG. 5) such that the conductors 43 and 44 do not contact to each other.

That is, in the first connection conductor 43 being the connection conductor 4, one end (lower side of the figure) is disposed between the projected ends of the first and second wire groups 21 and 22, and connected to the respective first and second wire groups 21 and 22; the other end (upper side of the figure) is arranged between the projected ends of third and fourth wire groups 33 and 34, and connected to the respective third and fourth wire groups 33 and 34. Axial through-holes 43*a*, which communicate with the flow path 201*a* of the first coolant flow member 201 (refer to FIG. 2), are provided in the one end, and axial through-holes 43*b*, which communicate with the flow path 302*a* of the second coolant flow member 302 (refer to FIG. 2), are provided in the other end. Connection of the second connection conductor 44 is made in the same way, wherein axial through-holes 44*a*, which communicate with the flow path 203*a* of the third coolant flow member 203, are provided in one end (lower side of the figure), and axial through-holes 44*b*, which communicate with the flow path 304*a* of the fourth coolant flow member 304, are provided in the other end. The following configuration is the same as in the embodiment 1: the previous conductive block is not used, and the connection conductor 4 is made to have a function of the conductive block, in addition, thickness T43 or T44 of the crossover connection conductor 4 (43 or 44) is made to be equal to width T (refer to FIG. 2) of each of the coolant flow members (201, 203, 302 and 304) in order to make a configuration where connection of the connection conductor is made on an extension line of each wire group without performing extra processing to the wire so as to save time in construction.

In the embodiment 2 configured as above, the conductive block is unnecessary as in the embodiment 1, and the material usage is reduced, in addition, weight of a tip of the end portion of the coil 5 is reduced, which is advantageous in vibration suppression. In addition, since the first and second crossover connection conductors 43 and 44 can be reduced in length compared with the previous one in which outer sides of the wire groups are connected to each other, reduction in material usage combined with the reduction in material usage given by eliminating need of the conductive block is large compared with the embodiment 1. Therefore, the reduction in weight of the tip of the coil 5 is also large compared with the embodiment 1, which is advantageous in vibration suppression. Moreover, the following configuration is used: the one end and the other end of each of the first and second crossover connection conductors 43 and 44 are connected in a manner of being interposed by adjacent wire groups respectively, which may eliminate portions connected to wire groups found in a crossover connection conductor in the past, consequently thermal resistance of the corresponding portion can be decreased. Particularly, since influence of thermal resistance at bonding surfaces between the crossover connection conductor and the wire groups can be greatly reduced, thermal resistance of a heat path X can be significantly decreased when heat generated in the crossover connection conductor 4 is radiated from the through-holes 43*a*, 43*b*, 44*a* and 44*b*, and therefore temperature rise can be suppressed, so that an allowable current of a generator can be increased.

Embodiment 3

Figure 6:
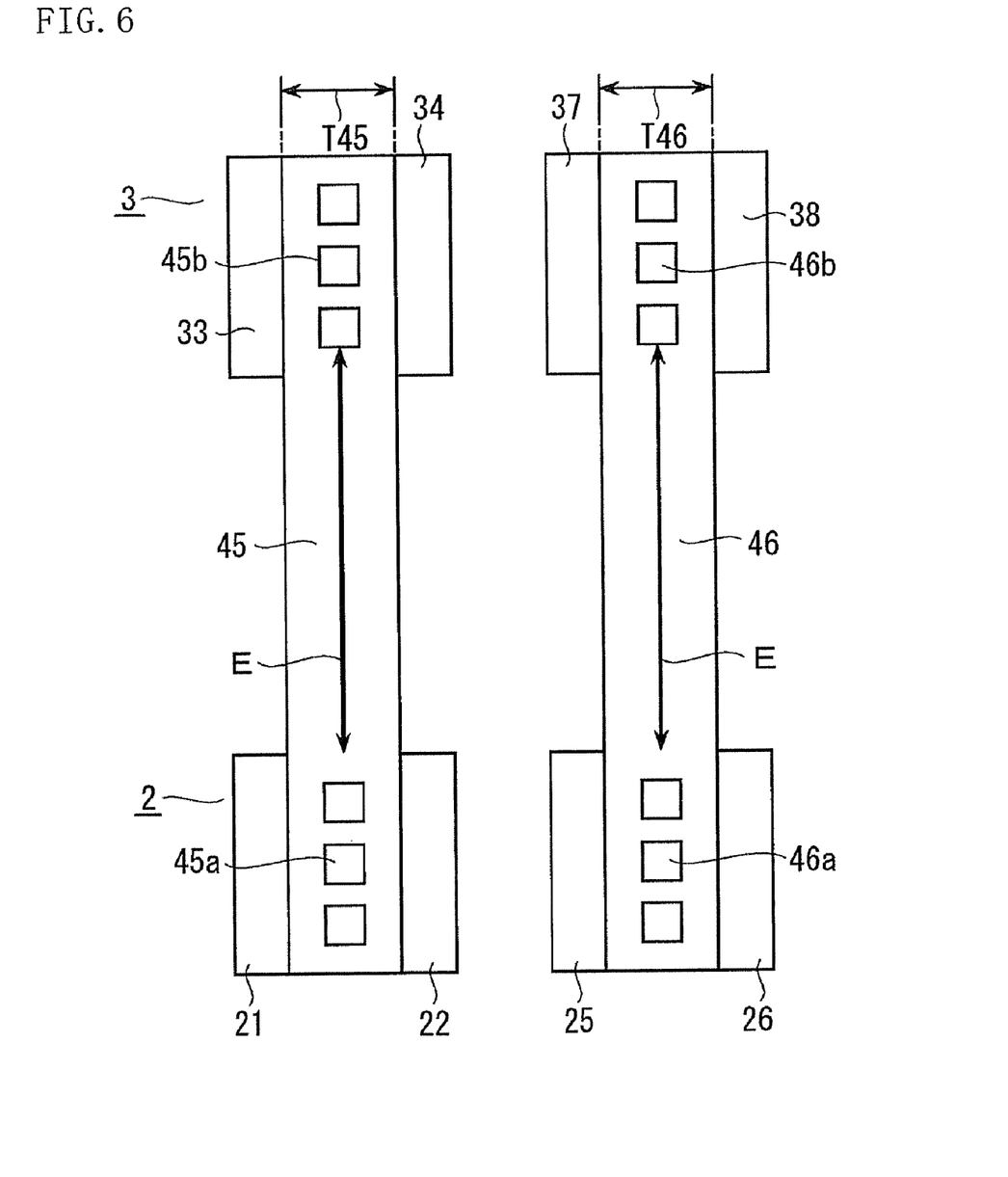
FIG. 6 shows a side diagram schematically showing a connection section of a stator of a rotating electric machine according to embodiment 3 of the invention, in the case that a connection conductor at a coil end is in a straight type.
Figure 7:
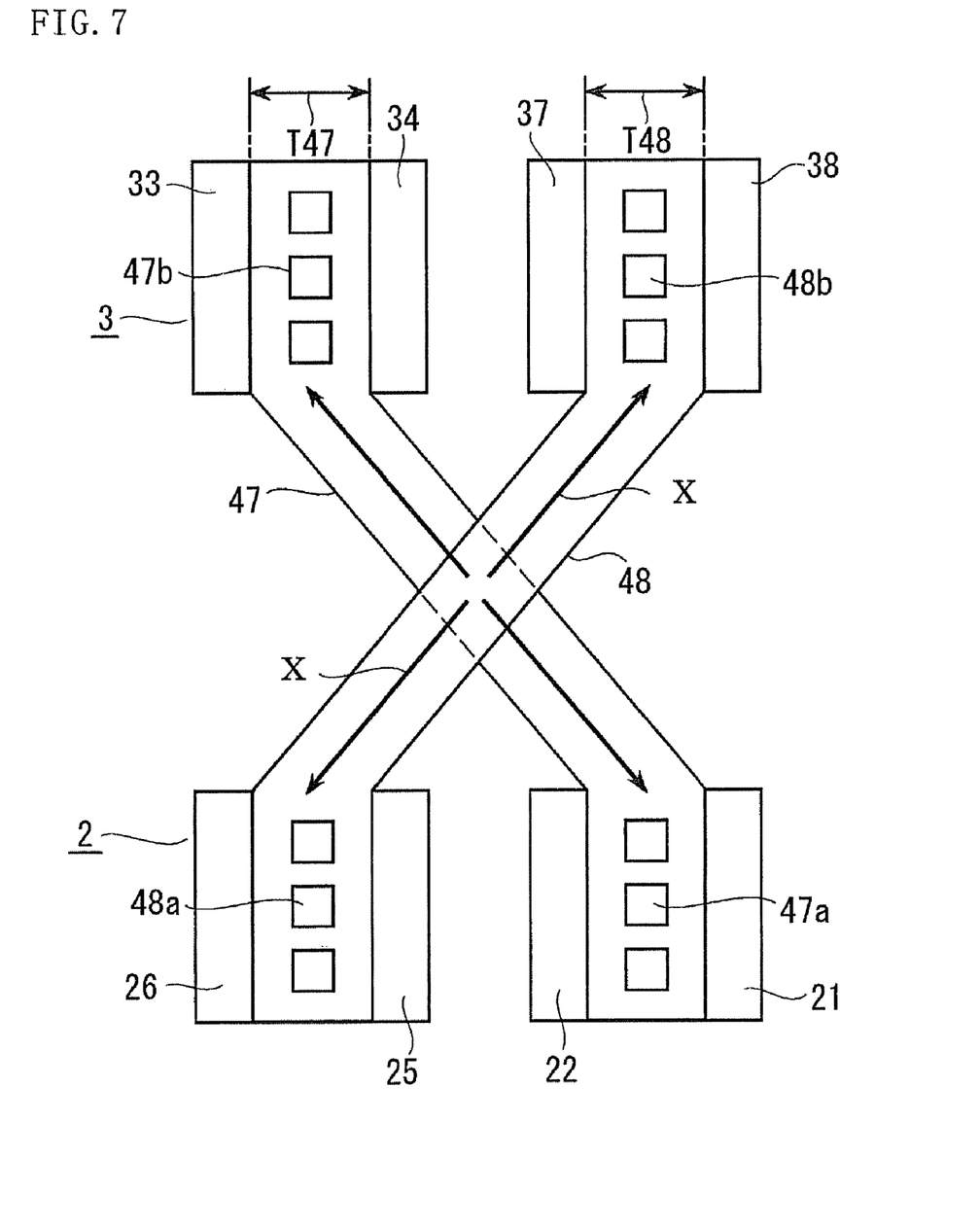
FIG. 7 shows a side diagram schematically showing a connection section of a stator of a rotating electric machine according to the embodiment 3 of the invention, in the case that a connection conductor at a coil end is in a crossover type.

FIGS. 6 and 7 show diagrams for illustrating a stator of a rotating electric machine according to embodiment 3 of the invention, and FIG. 6 shows a side diagram schematically showing a connection section of a stator coil end in the case that a connection conductor is in a straight type, and FIG. 7 shows a side diagram schematically showing a connection section of a stator coil end in the case that a connection conductor is in a crossover type, either of which corresponds to a diagram seen in the same direction as FIG. 3 of the embodiment 1. In the embodiments 1 and 2, width in a radial direction of each of the connection sections between the wire groups, the width being given by the connection conductor 4, is made to be approximately equal to be the width T of each coolant flow member, in the end of the coil 5. However, in a straight connection conductor of the embodiment 3, width T45 of a first connection conductor 45 being the connection conductor 4 and width T46 of a second connection conductor 46 being the connection conductor 4 (T45=T46) are made large compared with the width T (refer to FIG. 2) of the coolant flow member respectively, and in a crossover connection conductor, width T47 of a first connection conductor 47 being the connection conductor 4 and width T48 of a second connection conductor 48 being the connection conductor 4 (T47=T48) are made large compared with the width T (refer to FIG. 2) of the coolant flow member respectively, so that electric resistance of the connection conductor 4 is reduced, thereby loss is reduced. In addition, in the connection conductor 4, sectional area of a heat path E from a central portion to through-holes 45*a*, 45*b*, 46*a*, and 46*b* for ventilation, or sectional area of a heat path X from the central portion to through-holes 47*a*, 47*b*, 48*a*, and 48*b* for ventilation, the central portion being a cause of loss, can be increased, so that thermal resistance is decreased, consequently temperature rise in the connection conductor 4 can be suppressed. From the above, according to the embodiment 3, an allowable current of a generator can be further increased compared with the embodiments 1 and 2.

Embodiment 4

Figure 8:
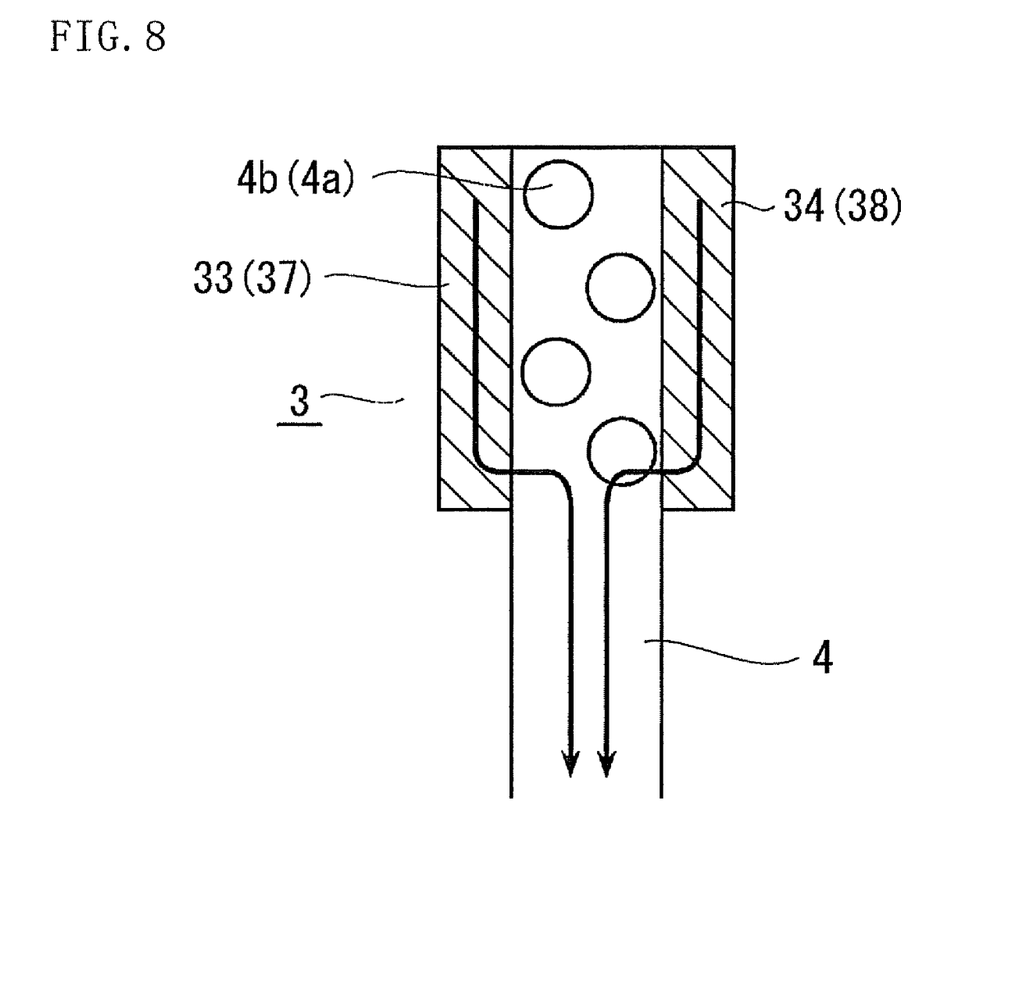
FIG. 8 shows an explanatory diagram schematically showing a connection section of a stator coil end, the connection section being a relevant part of a stator of a rotating electric machine according to embodiment 4 of the invention.

FIG. 8 shows an explanatory diagram schematically showing a connection section of a stator coil end being a relevant part of a stator of a rotating electric machine according to embodiment 4 of the invention. In the embodiment 4, through-holes for ventilation, which are provided in connection sections with wire groups in one end and the other end of a connection conductor 4, are made to be circular through-holes 4*a* and 4*b* as shown in FIG. 8, and arranged in a zigzag in a radial direction, so that the number of the through-holes 4*a* and 4*b* is increased compared with in the embodiment 3. While FIG. 8 shows an upper half, a lower half is configured in the same way. Other configurations are the same as in the embodiment 3, therefore description of them is omitted.

In the embodiment 4 configured as above, surface area of the through-holes 4*a* and 4*b* of the connection conductor 4 is increased, thereby cooling area is increased, which increases heat quantity transferred to cooling gas flowing through the through-holes 4*a* and 4*b*, therefore temperature rise in the connection conductor 4 can be suppressed, leading to an advantage that an allowable current of a generator can be further increased compared with the embodiment 3.

Embodiment 5

Figure 9:
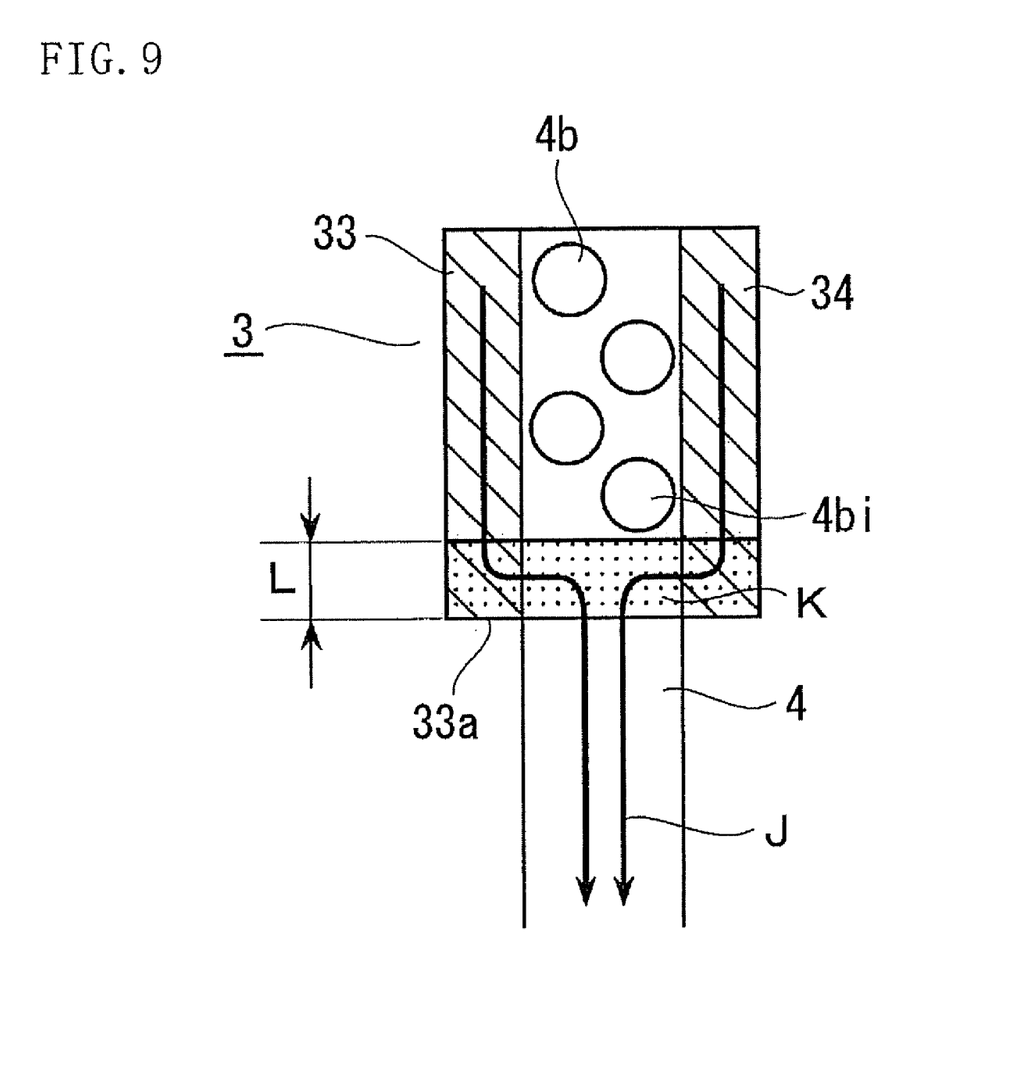
FIG. 9 shows an explanatory diagram schematically showing a connection section of a stator coil end, the connection section being a relevant part of a stator of a rotating electric machine according to embodiment 5 of the invention.

FIG. 9 shows an explanatory diagram schematically showing a connection section of a stator coil end being a relevant part of a stator of a rotating electric machine according to embodiment 5 of the invention. In the embodiment 5, among the plurality of through-holes 4*b* provided in the connection conductor 4 in the embodiment 4, in a connection section with an end of an outer diameter side coil 3, a through-hole 4*bi* at the most inner diameter side (downward side of the figure) is moved to a side of the other end of the connection conductor 4 (upward side of the figure), and is placed at a position at least a dimension L (L=10 mm) away from a position of an inner diameter side surface 33a of a third (fourth) wire group 33 (34), and in a connection section with an end of an inner diameter side coil 2, which is not shown in the figure, a through-hole (4a) at the most outer diameter side (upward side of the figure) is similarly moved to a side of one end (downward side of the figure) so that the through-holes may avoid a current concentration area K, the current flowing into the connection conductor 4, shown by many dots in the figure. A space between the through-holes 4b (4a) is narrowed compared with that in the embodiment 4.

In the embodiment 5 configured as above, the through-holes 4b (4a) for ventilation provided in the connection conductor 4 are made to be in a position away from a region of current penetration depth, thereby the through-holes 4b (4a) do not interfere with current flow, which reduces loss, and consequently an allowable current of a generator can be further increased compared with the embodiment 4.

Various modifications and alteration of this invention will be apparent to those skilled in the art without departing from the scope and spirit of this invention, and it should be understood that this is not limited to the illustrative embodiments set forth herein.

What is claimed is:

1. A stator of a rotating electric machine, comprising:
   a stator iron core having a plurality of slots;
   a plurality of sets of first, second, fifth and sixth wire groups at an inner diameter side of the core, and a plurality of sets of eighth, seventh, fourth and third wire groups at an outer diameter side of the core, each of the plurality of sets of first, second, fifth, sixth, eighth, seventh, fourth and third wire groups being inserted into one of plurality of slots in four rows and two stages, projecting from both of the slot ends in an axial direction;
   a plurality of sets of first coolant flow members, each first coolant flow member forming a coolant flow path in an axial direction, each set of first coolant flow members being disposed between the first and second wire groups of one of the sets thereof and projecting axially shorter than projected ends of such first and second wire groups;
   a plurality of sets of second coolant flow members, each second coolant flow member forming a coolant flow path in an axial direction, each set of second coolant flow members being disposed between the third and fourth wire groups of one of the sets thereof and projecting axially shorter than projected ends of such third and fourth wire groups;
   a plurality of sets of third coolant flow members, each third coolant flow member forming a coolant flow path in an axial direction, each set of second coolant flow members being disposed between the fifth and sixth wire groups of one of the sets thereof and projecting axially shorter than projected ends of such fifth and sixth wire groups;
   a plurality of sets of fourth coolant flow members, each third coolant flow member forming a coolant flow path in an axial direction, each set of second coolant flow members being disposed between the seventh and eighth wire groups of one of the sets thereof and projecting axially shorter than projected ends of such seventh and eighth wire groups;
   a plurality of first connection conductors, each having first and second end portions;
      said first end portion being interposed between the projected ends of the first and second wire groups of one of the sets, and having axial through-holes communicating with the flow paths of the set of first coolant flow members associated with such first and second wire groups;
      said second end portion being interposed between the projected ends of the third and fourth wire groups of one of the sets, and having axial through holes communicating with the flow paths of the set of second coolant flow members associated with such third and fourth wire groups; and
   a plurality of second connection conductors, each having first and second end portions;
      said first end portion of each second connection conductor being interposed between the projected ends of the fifth and sixth wire groups of one of the sets, and having axial through-holes communicating with the flow paths of the set of third coolant flow members associated with such fifth and sixth wire groups;
      said second end portion of each second connection conductor being interposed between the projected ends of the seventh and eighth wire groups of one of the sets, and having axial through holes communicating with the flow paths of the set of fourth coolant flow members associated with such seventh and eighth wire groups.

2. The stator of a rotating electric machine according to claim 1,
   wherein thickness in a circumferential direction of each connection conductor is larger than thickness in the circumferential direction of each of the first coolant flow member, the second coolant flow member, the third coolant flow member and the fourth coolant flow member.

3. The stator of a rotating electric machine according to claim 2,
   wherein the axial through-holes provided in each connection conductor have a circular section respectively, and are arranged in a zigzag pattern.

4. The stator of a rotating electric machine according to claim 1,
   wherein the axial through-holes provided in each connection conductor are placed in positions at least 10 mm away from a surface at an outer diameter side of the first, second, fifth and sixth wire groups, and placed in positions at least 10 mm away from a surface at an inner diameter side of the third, fourth, seventh and eighth wire groups, respectively.

5. A stator of a rotating electric machine, comprising:
   a stator iron core having a plurality of slots;
   a plurality of pairs of first and second wire groups at an inner diameter side of the core, and a plurality of pairs of third and fourth wire groups at an outer diameter side of the core, each of the plurality of pairs of first, second, third and fourth wire groups being inserted into one of the plurality of slots in two rows and two stages, projecting from both of the slot ends in an axial direction;
   a plurality of sets of first coolant flow members, each first coolant flow member forming a coolant flow path in an axial direction, each set of first coolant flow members being disposed between the first and second wire groups of one of the pairs thereof and projecting axially shorter than projected ends of such pair;
   a plurality of sets of second coolant flow members, each second coolant flow member forming a coolant flow path in an axial direction, each set of second coolant flow members being disposed between the third and fourth wire groups of one of the pairs thereof and projecting axially shorter than projected ends of such pair;
   a plurality of connection conductors, each having first and second end portions;

said first end portion being interposed between the projected ends of one of the pairs of first and second wire groups, and having axial through-holes communicating with the flow paths of the set of first coolant flow members associated with such one pair of first and second wire groups;

said second end portion being interposed between the projected ends of one of the pairs of third and fourth wire groups, and having axial through holes communicating with the flow paths of the set of second coolant flow members associated with such one pair of third and fourth wire groups.

6. The stator of a rotating electric machine according to claim 5, wherein thickness in a circumferential direction of each connection conductor is larger than thickness in the circumferential direction of each of the first coolant flow member and the second coolant flow member.

7. The stator of a rotating electric machine according to claim 6, wherein the axial through-holes provided in each connection conductor have a circular section respectively, and are arranged in a zigzag pattern.

8. The stator of a rotating electric machine according to claim 5, wherein the axial through-holes provided in each connection conductor are placed in positions at least 10 mm away from a surface at an outer diameter side of the first and second wire groups, and placed in positions at least 10 mm away from a surface at an inner diameter side of the third and fourth wire groups, respectively.

* * * * *